United States Patent
Hsu et al.

(10) Patent No.: US 11,320,327 B2
(45) Date of Patent: May 3, 2022

(54) PRESSURE SENSING DEVICE AND MANUFACTURING METHOD THEREOF

(71) Applicant: MEDX TECHNOLOGY INC., Taipei (TW)

(72) Inventors: Chia-Ming Hsu, Taipei (TW); Chun Lin, Taipei (TW)

(73) Assignee: MEDX TECHNOLOGY INC., Taipei (TW)

( * ) Notice: Subject to any disclaimer, the term of this patent is extended or adjusted under 35 U.S.C. 154(b) by 114 days.

(21) Appl. No.: 16/933,619

(22) Filed: Jul. 20, 2020

(65) Prior Publication Data

US 2021/0018381 A1 Jan. 21, 2021

(30) Foreign Application Priority Data

Jul. 18, 2019 (TW) .................................. 108125397

(51) Int. Cl.
*G01L 1/20* (2006.01)
*G01L 1/22* (2006.01)

(52) U.S. Cl.
CPC ............ *G01L 1/225* (2013.01); *G01L 1/2287* (2013.01)

(58) Field of Classification Search
CPC ..... G06F 3/0414; G06F 3/0412; G01L 1/225; G01L 1/2287
See application file for complete search history.

(56) References Cited

U.S. PATENT DOCUMENTS

| | | | | |
|---|---|---|---|---|
| 11,029,222 | B2* | 6/2021 | Cho | G01L 1/20 |
| 2008/0054875 | A1* | 3/2008 | Saito | G01L 1/205 |
| | | | | 324/71.5 |
| 2012/0119100 | A1* | 5/2012 | Muraoka | A61B 6/4233 |
| | | | | 250/370.09 |
| 2013/0113057 | A1* | 5/2013 | Taylor | G01N 3/08 |
| | | | | 257/417 |
| 2020/0042043 | A1* | 2/2020 | Lee | G06F 1/1626 |
| 2020/0256748 | A1* | 8/2020 | Oh | G01L 5/161 |
| 2021/0270592 | A1* | 9/2021 | Zhang | G01L 1/22 |
| 2021/0307531 | A1* | 10/2021 | Lee | A47C 27/053 |

* cited by examiner

*Primary Examiner* — Max H Noori
(74) *Attorney, Agent, or Firm* — Osha Bergman Watanabe & Burton LLP

(57) ABSTRACT

A pressure sensing device includes a substrate, at least a pressure sensing module, and a packaging layer. The pressure sensing module is arranged at the substrate including a plurality of conductive units, a plurality of pressure sensing blocks and a plurality of buffer units. Each conductive unit has a first electrode and a second electrode. The pressure sensing blocks are respectively arranged at the conductive units. Each pressure sensing block has a circuit structure that electrically connects the first electrode and the second electrode of each corresponding conductive unit. Each buffer unit is arranged between each corresponding conductive unit and each corresponding pressure sensing block comprising a plurality of buffer bumps arranged in an array at the first electrode and the second electrode of each corresponding conductive units. The packaging layer is bonded to the substrate, the conductive units and the pressure sensing blocks.

20 Claims, 11 Drawing Sheets

PRESSURE SENSING DEVICE AND MANUFACTURING METHOD THEREOF

TECHNICAL FIELD

One or more embodiments of the present invention relate to a pressure sensing device, in particular to a pressure sensing device and a manufacturing method thereof.

BACKGROUND

With the rapid development of science and technology, pressure sensing devices can be applied to increasingly diverse products. For example, pressure sensing devices appear in chair cushions, mattresses, medical equipment, even clothing, insoles, VR (Virtual Reality) equipment, etc. At present, the common thin pressure sensing device is mainly manufactured by a screen printing process, in which a conductive circuit is usually printed on a substrate, then a plurality of pressure sensing blocks electrically connected to the conductive circuit are arranged at the conductive circuit, and a layer of sealing film is finally hot-pressed or roller hot-pressed at the substrate and the pressure sensing blocks to form the pressure sensing device. However, during the process of hot-pressing the sealing film, the pressure sensing blocks are also subjected to the roller hot-pressing, such that excessive relative shifts may be generated for the positions of the circuit structures in some pressure sensing blocks, which may easily cause errors in the sensitivity of the pressure sensing device sealed.

SUMMARY

One or more embodiments of the present invention provide a pressure sensing device, which can ensure that each pressure sensing block in the packaged pressure sensing device can be maintained in a preset uncompressed state.

In one or more embodiments, the pressure sensing device of the present invention is adapted to sense pressure and be electrically connected to a processing unit. The pressure sensing device comprises a substrate, at least one pressure sensing module, and a packaging layer. The pressure sensing module is arranged at the substrate, and comprises a plurality of conductive units, a plurality of pressure sensing blocks, and a plurality of buffer units. Each of the conductive units has a first electrode and a second electrode spaced apart from each other and arranged at the substrate, a first wire connected to the first electrode for grounding, and a second wire connected to the second electrode and electrically connected to the processing unit. The pressure sensing blocks are arranged at the conductive units respectively, and each of the pressure sensing blocks has a circuit structure that electrically connects the first electrode and the second electrode of the corresponding each of the conductive units and can produce different resistances at different degrees of pressure. Each buffer unit is arranged between the corresponding each of the conductive units and each of the pressure sensing blocks, and each of the buffer units comprises a plurality of buffer bumps arranged in an array at the first electrode and the second electrode of the corresponding each of the conductive units. The packaging layer is bonded to the substrate and the conductive units and pressure sensing blocks of the pressure sensing module.

In one or more embodiments, each of the buffer bumps has a height of 0.01 mm to 0.05 mm.

In one or more embodiments, each of the buffer bumps has a diameter of 0.1 mm to 0.5 mm.

In one or more embodiments, a distance between every two buffer bumps is 1 mm to 3 mm.

In one or more embodiments, a material of each of the buffer bumps is insulating ink.

In one or more embodiments, each of the buffer units further comprises a buffer wall covering the corresponding each of the conductive units and surrounding the buffer bumps, the first electrode and the second electrode therein.

In one or more embodiments, the buffer wall is hollow and square.

In one or more embodiments, a material of the buffer wall is insulating ink.

In one or more embodiments, the pressure sensing device further comprises a release layer arranged at the packaging layer and having a hardness greater than that of the packaging layer.

In one or more embodiments, the pressure sensing module further comprises a plurality of adhesive units arranged at the substrate and respectively corresponding to the conductive units, and each of the adhesive units has a plurality of adhesive bodies around the first electrode and the second electrode to adhere a lower surface of the pressure sensing blocks.

In one or more embodiments, the conductive units of the at least one pressure sensing module are arranged apart in a left-right direction, the first electrode and the second electrode of each of the conductive units are spaced apart in a front-back direction, and the pressure sensing device comprises a plurality of pressure sensing modules.

One or more embodiments of the present invention provide another pressure sensing device, which can ensure that each pressure sensing block in the packaged pressure sensing device can be maintained in a preset uncompressed state.

In one or more embodiments, the pressure sensing device of the present invention is adapted to sense pressure and be electrically connected to a processing unit. The pressure sensing device comprises a substrate, at least one pressure sensing module, and a packaging layer. The pressure sensing module is arranged at the substrate, and comprises a plurality of conductive units, a plurality of pressure sensing blocks, and a plurality of buffer units. Each of the conductive units has a first electrode and a second electrode spaced apart from each other and arranged at the substrate, a first wire connected to the first electrode for grounding, and a second wire connected to the second electrode and electrically connected to the processing unit. The pressure sensing blocks are arranged at the conductive units respectively, and each of the pressure sensing blocks has a circuit structure that electrically connects the first electrode and the second electrode of the corresponding each of the conductive unit and can produce different resistances at different degrees of pressure. Each of the buffer units is arranged between the corresponding each of the conductive unit and each of the pressure sensing blocks, and each of the buffer units comprises a buffer wall surrounding the corresponding each of the conductive units. The packaging layer is bonded to the substrate and the conductive units and pressure sensing blocks of the pressure sensing module.

In one or more embodiments, the buffer wall has a height of 0.01 mm to 0.05 mm.

In one or more embodiments, the buffer wall is hollow and square.

In one or more embodiments, a material of the buffer wall is insulating ink.

In one or more embodiments, the pressure sensing device further comprises a release layer arranged at the packaging layer and having a hardness greater than that of the packaging layer.

In one or more embodiments, the pressure sensing module further comprises a plurality of adhesive units arranged at the substrate and respectively corresponding to the conductive units, and each of the adhesive units has a plurality of adhesive bodies around the first electrode and the second electrode to adhere a lower surface of the pressure sensing blocks.

In one or more embodiments, each of the pressure sensing blocks further comprises an insulating layer, and the circuit structure is a plurality of conductive particles dispersed at the insulating layer.

In one or more embodiments, the conductive units of the at least one pressure sensing module are arranged apart in the left-right direction, the first electrode and the second electrode of each of the conductive units are spaced apart in the front-back direction, and the pressure sensing device comprises a plurality of pressure sensing modules.

In addition, one or more embodiments of the present invention provide a manufacturing method of a pressure sensing device.

In one or more embodiments, the manufacturing method of the pressure sensing device according to the present invention comprises forming a plurality of conductive units on a substrate by screen printing, each of the conductive units having a first electrode and a second electrode spaced apart from each other and arranged at the substrate; forming a plurality of buffer units on the conductive units by screen printing, each of the buffer units comprising a plurality of buffer bumps arranged in an array at the first electrode and the second electrode of the corresponding each of the conductive units; providing a plurality of pressure sensing blocks arranged at the buffer units respectively, each of the pressure sensing blocks has a circuit structure that electrically connects the first electrode and the second electrode of the corresponding each of the conductive units and can produce different resistances at different degrees of pressure; and bonding a packaging layer to the substrate, the conductive units and the pressure sensing blocks by hot pressing.

In one or more embodiments, after the step of screen-printing the buffer bumps, the manufacturing method further comprises a step of forming a plurality of buffer walls on the conductive unit by screen printing, the plurality of buffer walls surrounding the buffer bumps, the first electrode and the second electrode therein.

In one or more embodiments, the packaging layer is bonded to the substrate, the conductive units and the pressure sensing blocks by hot pressing together with a release layer having a hardness greater than that of the packaging layer.

Yet one or more embodiments of the present invention provide another manufacturing method of a pressure sensing device.

In one or more embodiments, the manufacturing method of the pressure sensing device according to the present invention comprises: forming a plurality of conductive units on a substrate by screen printing, each of the conductive units has a first electrode and a second electrode spaced apart from each other and arranged at the substrate; forming a plurality of buffer units on the conductive unit by screen printing, each of the buffer units comprises a buffer wall surrounding the corresponding each of the conductive units; providing a plurality of pressure sensing blocks arranged at the buffer units respectively, each of the pressure sensing blocks has a circuit structure that electrically connects the first electrode and the second electrode of the corresponding each of the conductive units and can produce different resistances at different degrees of pressure; and bonding a packaging layer to the substrate, the conductive units and the buffer units by hot pressing.

In one or more embodiments, the packaging layer is bonded to the substrate, the conductive units and the pressure sensing blocks by hot pressing together with a release layer having a hardness greater than that of the packaging layer.

The beneficial effects of one or more embodiments of the present invention are: the plurality of pressure sensing blocks are electrically connected to the first electrodes and the second electrodes of the plurality of conductive units respectively, and when the pressure sensing module of the pressure sensing device is pressed, the resistances of the circuit structure of the pressure sensing blocks change, such that current of different magnitudes flows through the first electrodes and the second electrodes, and the processing unit can then determine the magnitude of the pressure; in addition, the buffer units are arranged at the conductive units, and no matter whether the buffer units are a plurality of buffer bumps arranged in an array at the first electrodes and the second electrodes, or are buffer walls surrounding the first electrodes and the second electrodes, the pressure sensing blocks can be prevented from being excessively tightly connected to the first electrodes and the second electrodes of the conductive units due to packaging of the packaging layer, thereby ensuring that each pressure sensing block in the packaged pressure sensing device can be maintained a preset uncompressed state to achieve accurate pressure sensing sensitivity.

BRIEF DESCRIPTION OF DRAWINGS

Other features and functions of the present invention will be clearly presented in the embodiments with reference to the drawings, in which.

DETAILED DESCRIPTION

Figure 1:
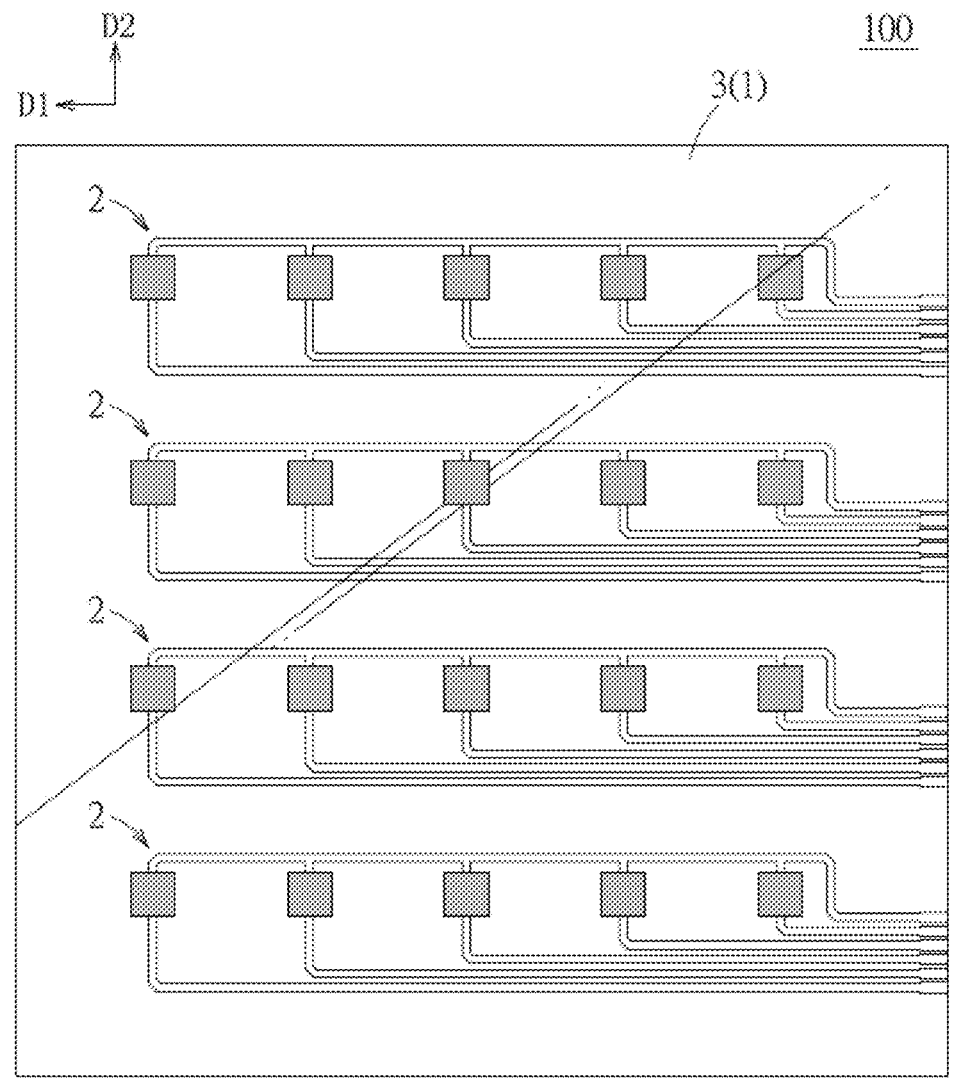
FIG. 1 is a schematic top view of a pressure sensing device according to one or more embodiments of the present invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 4:
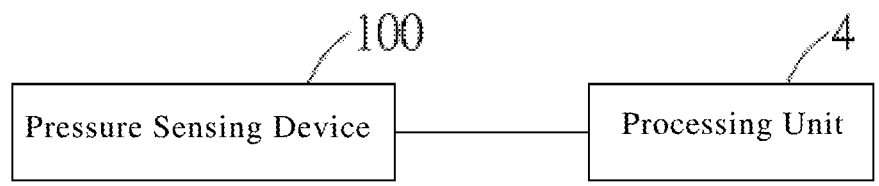
FIG. 4 is a block diagram illustrating that a pressure sensing device of one or more embodiments is electrically connected to a processing unit.

Referring to FIGS. 1 and 4, a pressure sensing device 100 of one or more embodiments of the present invention is adapted to sense the pressure and be electrically connected to a processing unit 4. In this embodiment, the pressure sensing device 100 is arranged in a chair cushion (not shown) as an example, and the processing unit 4 may be a processor arranged in a chair back (not shown) connected to the chair cushion. When the processing unit 4 receives a signal transmitted by the pressure sensing device 100, the processing unit 4 sends another signal to a terminal device (e.g., a smart phone, a tablet computer, a desktop computer, etc.) for an operator to observe and evaluate the magnitude of the pressure on the chair cushion and pressure values of different areas on the chair cushion when the chair cushion bears a user. In a modified embodiment, the pressure sensing device 100 may also be arranged in a mattress, an insole or other equipment, and the processing unit 4 may also be a remote device that receives the signal transmitted by the pressure sensing device 100 by means of wireless transmission, and is not limited to any of the above embodiments.

Referring to FIGS. 1 to 4, a pressure sensing device according to one or more embodiments of the present invention comprises a substrate 1, a plurality of pressure sensing modules 2, and a packaging layer 3. The material of the substrate 1 is polyethylene terephthalate (PET), and its appearance is a rectangular sheet. Each pressure sensing module 2 is elongated and arranged at the surface of the substrate 1 in a left-right direction D1, and the pressure sensing modules 2 are arranged at the surface of the substrate 1 apart in a front-back direction D2, such that the pressure sensing modules 2 are uniformly arranged at the substrate 1 to measure the pressure value of each area on the substrate 1 as completely as possible.

Figure 5:
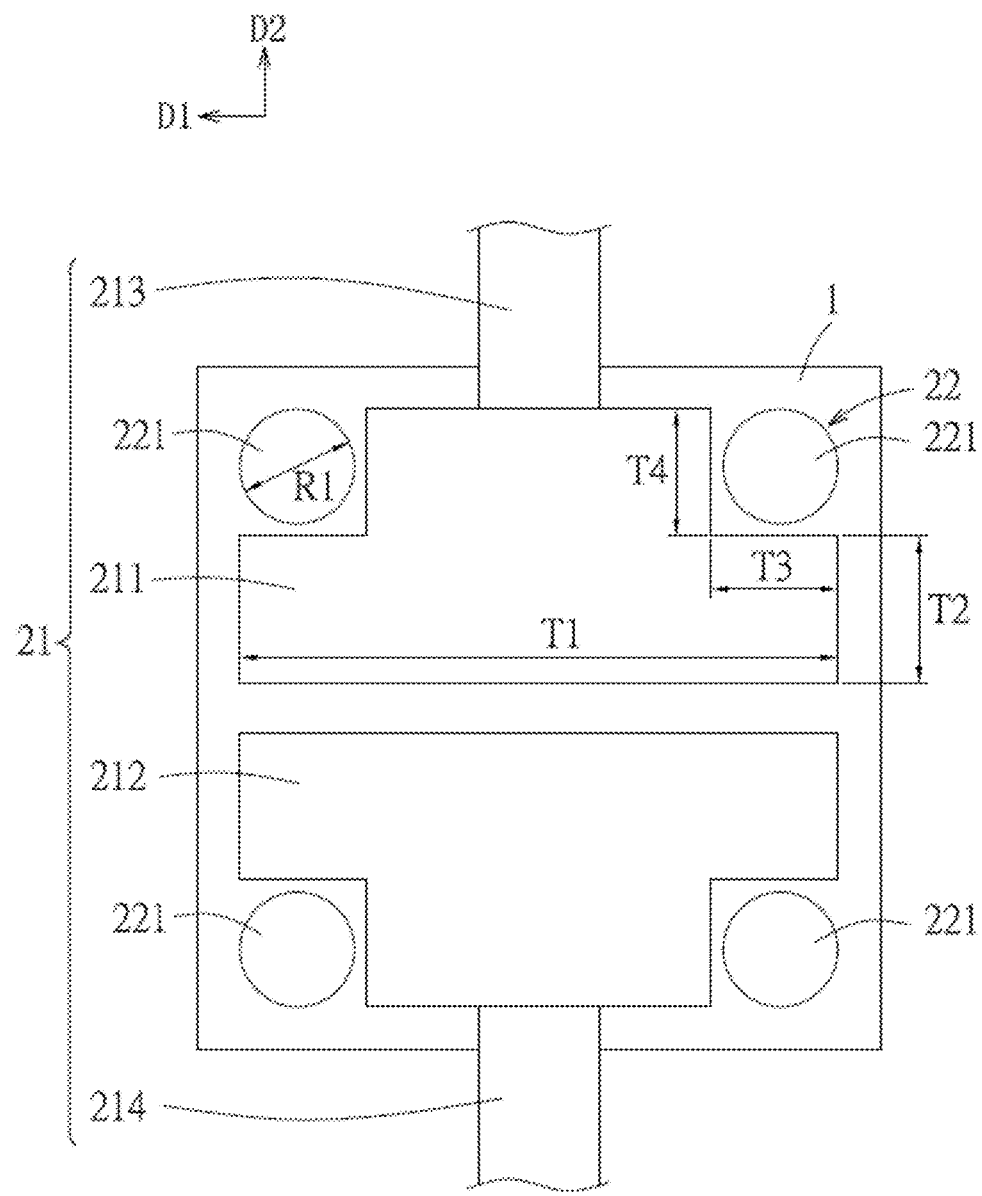
FIG. 5 is a schematic top view illustrating one of the conductive units of each pressure sensing module and one of the adhesive units of each pressure sensing module.

Referring to FIG. 5, each pressure sensing module 2 comprises a plurality of conductive units 21, a plurality of adhesive units 22, a plurality of pressure sensing blocks 23, and a plurality of buffer units 24. The conductive units 21 are arranged apart in the left-right direction D1, and each conductive unit 21 has a first electrode 211 and a second electrode 212 spaced apart from each other at the substrate 1 in the front-back direction D2, a first wire 213 connected to the first electrode 211 for grounding, and a second wire 214 connected to the second electrode 212 and electrically connected to the processing unit 4. The first electrode 211 and the second electrode 212 present a mirror-symmetrical T-shaped structure, and in this embodiment, first sides T1 of the first electrode 211 and the second electrode 212 have lengths of 7.9 mm, second sides T2 of the first electrode 211 and the second electrode 212 have lengths of 2 mm, third sides T3 of the first electrode 211 and the second electrode 212 have lengths of 1.7 mm, and fourth sides T4 of the first electrode 211 and the second electrode 212 have lengths of 1.7 mm, such that the first electrode 211 and the second electrode 212 of each conductive unit 21 can be miniaturized, but are not limited to these values. The first wires 213 of the conductive units 21 respectively extend upward for a short distance from upper sides of the corresponding first electrodes 211, then are connected in the left-right direction D1, and extend to the right together for grounding. The second wires 214 of the conductive units 21 respectively extend downward for a distance from lower sides of the corresponding second electrodes 212, and then extend rightward side by side to a side edge of the substrate 1.

Further referring to FIG. 5, the adhesive units 22 are arranged at the substrate 1, and correspond to the conductive units 21 respectively to adhere the pressure sensing blocks 23 respectively. Each adhesive unit 22 has four adhesive bodies 221 at peripheral sides of the first electrode 211 and the second electrode 212. The adhesive bodies 221 are respectively at four recessed angles of the T-shaped structure of the first electrode 211 and the second electrode 212, and each adhesive body 221 has a diameter R1 of 1.5 mm. The arrangement positions of the first electrode 211, the second electrode 212 and the adhesive bodies 221 and the diameter of the adhesive bodies 221 contribute to the miniaturization of the pressure sensing module 2.

Referring to FIG. 3 and FIGS. 5 to 8, the pressure sensing blocks 23 are respectively arranged at the conductive units 21, and each pressure sensing block 23 can produce different resistances corresponding to different degrees of pressure, such that current of different magnitudes flows through the first electrode 211 and the second electrode 212. Specifically, each pressure sensing block 23 has an insulating layer 231 and a circuit structure 232 arranged at the insulating layer 231. A lower surface of the insulating layer 231 is adhered to the adhesive bodies 221 of each adhesive unit 22, such that a lower surface 232a of the pressure sensing block 23 can be mechanically connected to the substrate 1 through the adhesive bodies 221, and the circuit structure 232 is electrically connected to the first electrode 211 and the second electrode 212 of the corresponding conductive unit 21. The insulating layer 231 is of a rubber material, the circuit structure 232 is a plurality of conductive particles 232a uniformly dispersed in the insulating layer 231 in an up-down direction D3, and a plurality of parts of the conductive particles 232a are exposed to the lower surface of the insulating layer 231 to be electrically connected to the first electrode 211 and the second electrode 212 of the corresponding conductive unit 21, such that the pressure sensing block 23 becomes a pressure sensitive conductive elastomer. In detail, when the pressure sensing block 23 is in an uncompressed normal state, the distance between the conductive particles 232a is large, such that the resistance of the pressure sensing block 23 approaches infinity, and the current cannot flow to the first electrode 211 and the second electrode 212 via the conductive particles 232a. When the pressure sensing module 2 is pressed in the up-down direction D3, then part of or all of the pressure sensing block 23 is in a compressed state, such that the insulating layer 231 of the pressure sensing block 23 is elastically deformed. As the pressure received by the pressure sensing block 23 increases, the distance between the conductive particles 232a decreases, the resistance value of the pressure sensing block 23 also decreases, such that the current can flow to the first electrode 211 and the second electrode 212 via the conductive particles 232a, different current values can be formed corresponding to different resistance values, then the processing unit 4 provides different signals accordingly for the operator to evaluate the pressure value. In one or more embodiments, the pressure sensing block 23 may also be a conductive block of other type, the circuit structure 232 may also be other piezoelectric structure, and they are not limited to such embodiment.

Figure 2:
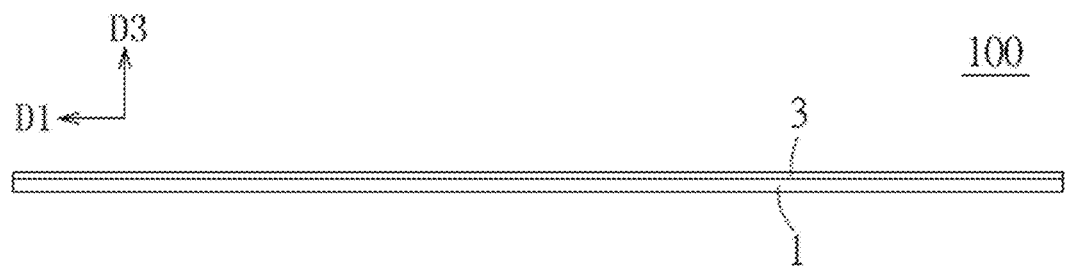
FIG. 2 is a schematic side view of one or more embodiments, illustrating that a packaging layer is packaged on a substrate.
Figure 3:
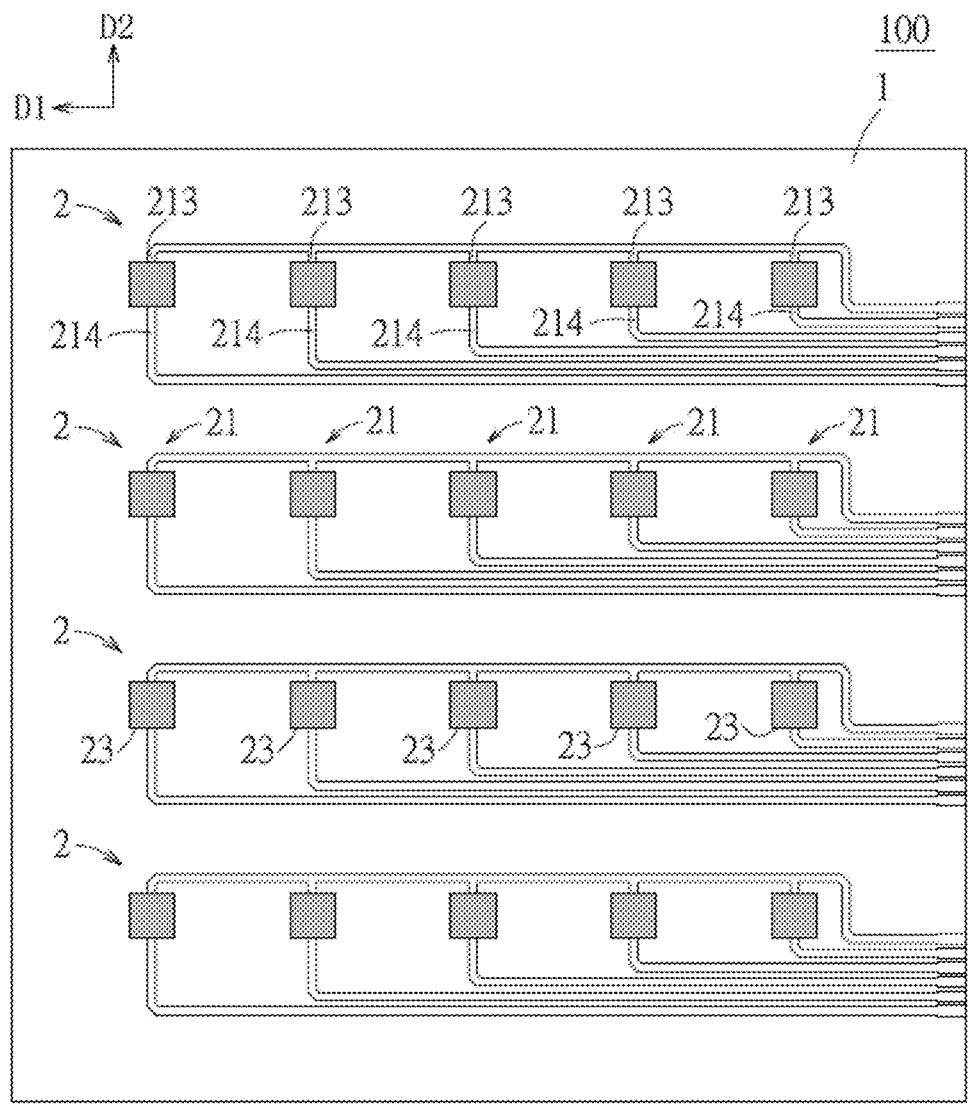
FIG. 3 is a schematic top view without showing the packaging layer, illustrating a plurality of pressure sensing modules of one or more embodiments.
Figure 6:
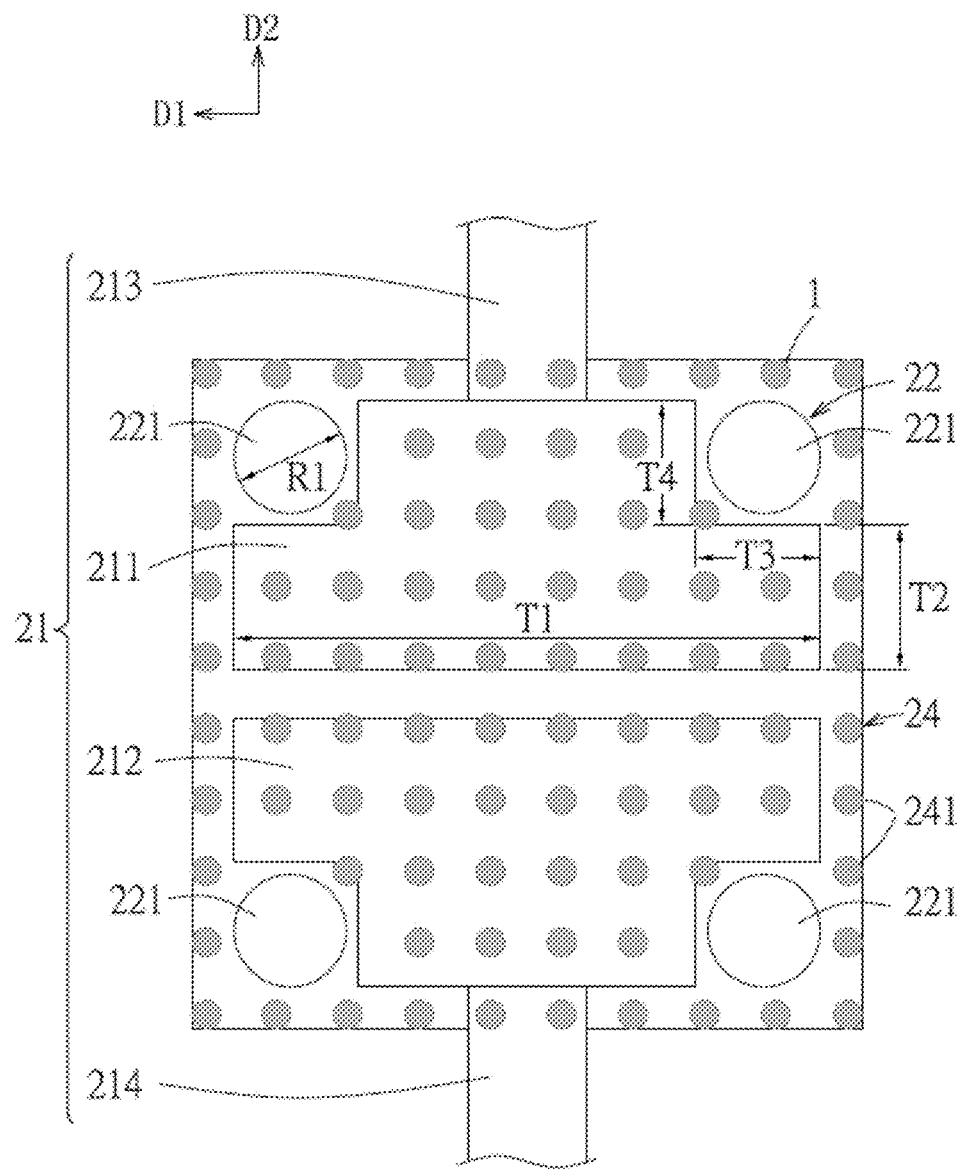
FIG. 6 is a schematic top view illustrating that one of the buffer units of each pressure sensing module is arranged at a conductive unit, and the buffer unit comprises a plurality of buffer bumps arranged in an array at the corresponding conductive unit.
Figure 7:
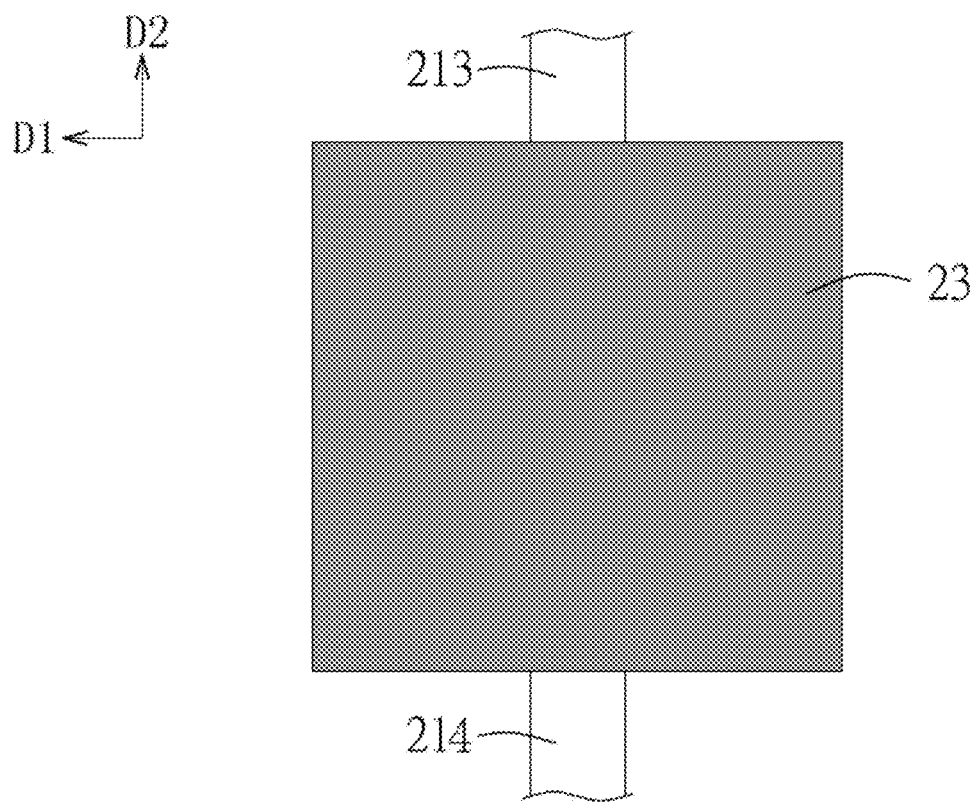
FIG. 7 is a schematic top view illustrating that one of the pressure sensing blocks of each pressure sensing module is arranged at a conductive unit, such that each buffer unit is located between each corresponding conductive unit and each corresponding pressure sensing block.
Figure 8:
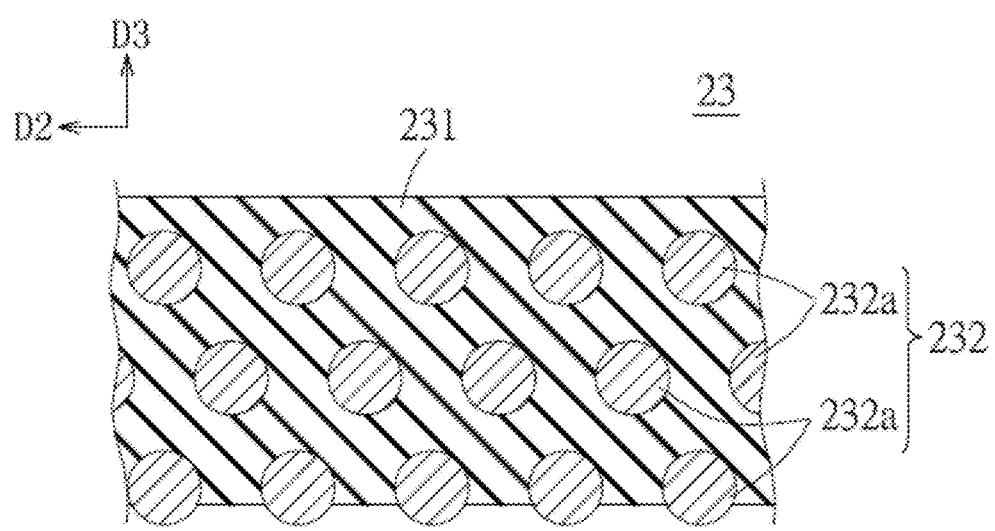
FIG. 8 is a schematic cross-sectional view illustrating that the pressure sensing block has an insulating layer and a circuit structure arranged at the insulating layer, and the circuit structure is a plurality of conductive particles uniformly dispersed in the insulating layer.

Referring to FIGS. 2, 3 and 6, each buffer unit 24 in FIG. 6 is arranged between corresponding each conductive unit 21 and each pressure sensing block 23 in FIG. 3, to buffer the pressure caused to the pressure sensing blocks 23 when a roller (not shown) hot-presses the packaging layer 3 at the substrate 1 and the pressure sensing modules 2. Specifically, in one or more embodiments, each buffer unit 24 comprises a plurality of buffer bumps 241 arranged in an array at the first electrode 211 and the second electrode 212 of the corresponding conductive unit 21, and each buffer bump 241 is formed by insulating ink. The material of the packaging layer 3 is thermoplastic polyurethane (TPU), and is bonded to the substrate 1 and the conductive units 21 and the buffer units 24 of the pressure sensing modules 2 by roller hot-pressing during the process of manufacturing the pressure sensing device 100, to complete the packaging of the pressure sensing device 100. Therefore, by pre-arranging the buffer bumps 241 at the first electrode 211 and the second electrode 212 of the conductive unit 21 in advance, during the process of hot-pressing and packaging of the pressure sensing device 100, the buffer bumps 241 can absorb the pressure generated by the roller hot-pressing on the pressure sensing blocks 23, to avoid inaccurate pressure sensing sensitivity caused by excessively tight connection of the pressure sensing blocks 23 to the first electrode 211 and the second electrode 212 during the rolling of the roller, thereby ensuring that each pressure sensing block 23 in the packaged pressure sensing device can be maintained in a preset uncompressed state before use to achieve accurate pressure sensing sensitivity. In this embodiment, each buffer bump 241 has a height of 0.01 mm to 0.05 mm and a diameter of 0.1 mm to 0.5 mm, and the distance between every two buffer bumps 241 is 1 mm to 3 mm, which may be arranged correspondingly at the miniaturized pressure sensing module 2, but the value ranges are not limited thereto.

The pressure sensing device 100 according to one or more embodiments of the present invention may have various different modified embodiments.

Figure 9:
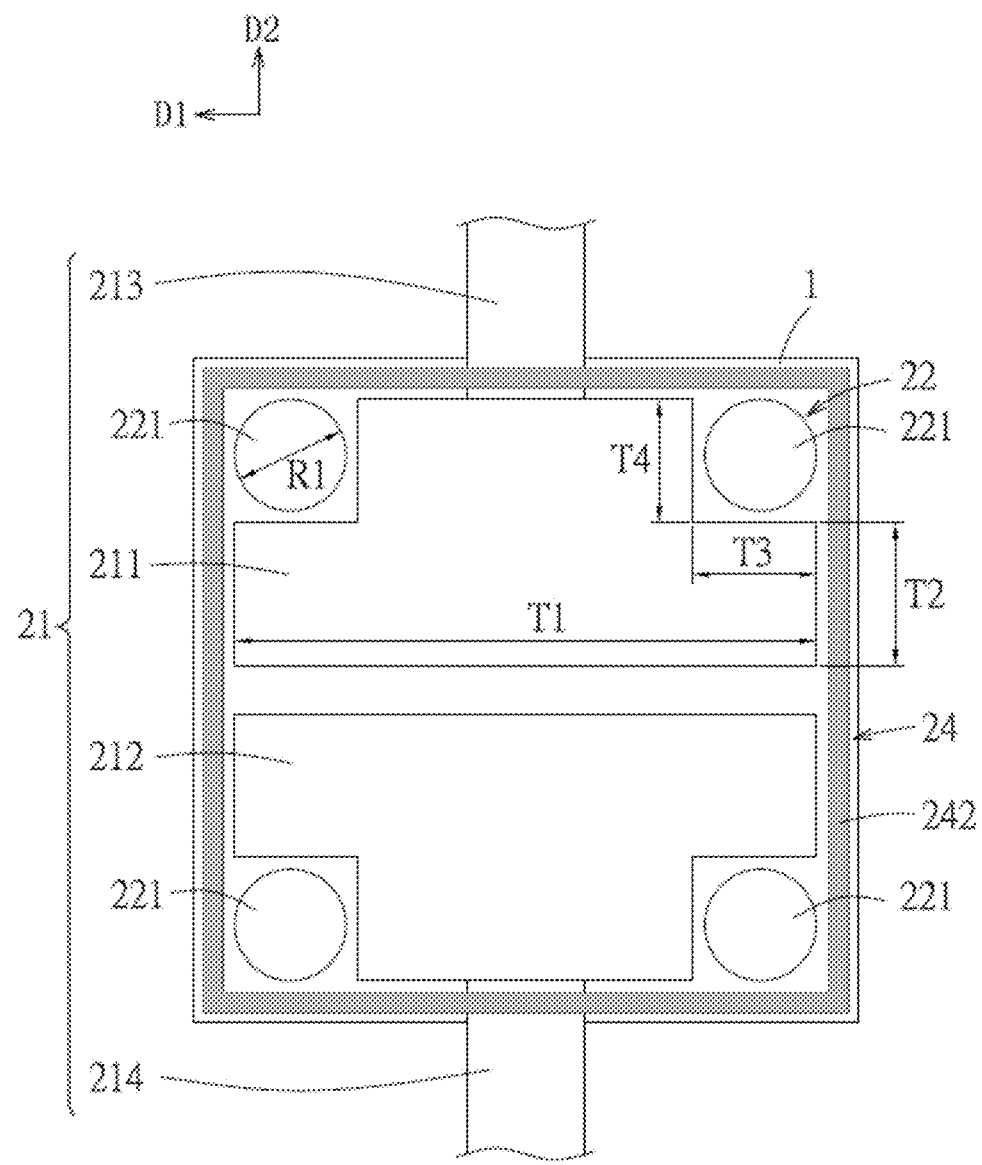
FIG. 9 is a schematic partial top view of a pressure sensing device according to one or more embodiments of the present invention, illustrating that each buffer unit of one or more embodiments comprises a buffer wall arranged around the corresponding conductive unit.

Referring to FIG. 9, the pressure sensing device 100 according to one or more embodiments of the present invention is shown. Each buffer unit 24 comprises a buffer wall 242 surrounding the corresponding conductive unit 21. Specifically, the material of the buffer wall 242 is insulating ink, and the buffer wall 242 surrounds the first electrode 211 and the second electrode 212 in a hollow and square shape. The buffer wall 242 has a height of 0.01 mm, an inner perimeter of 24 mm (that is, each inner side is 6 mm), and an outer perimeter of 32 mm to 56 mm (that is, each outer side may be 8 mm, 10 mm, 12 mm or 14 mm). By pre-arranging the buffer walls 242 on the conductive units 21, during the processing of the hot-pressing, the pressure sensing device can also achieve the effect of avoiding inaccurate pressure sensing sensitivity caused by excessively tight connection of the pressure sensing blocks 23 to the first electrode 211 and the second electrode 212 after the rolling by the roller.

Figure 10:
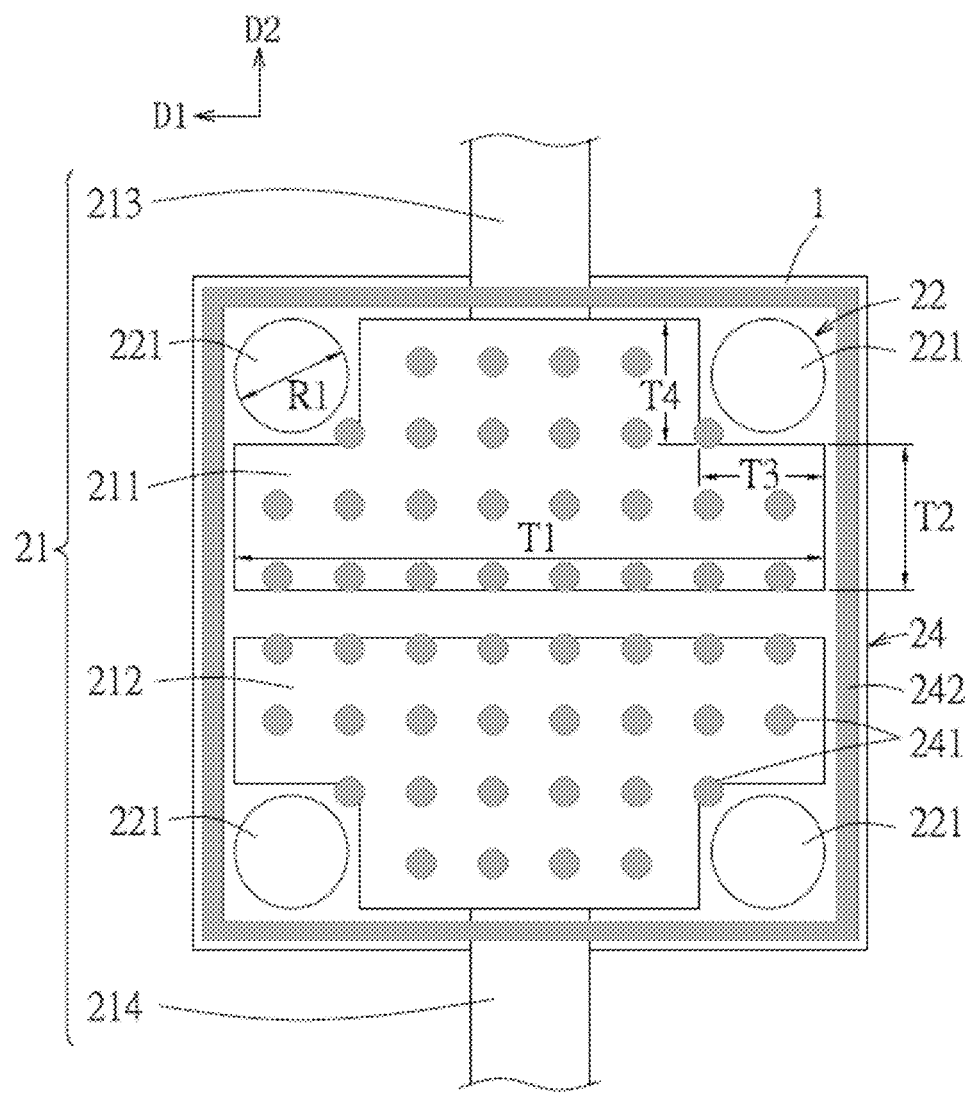
FIG. 10 is a schematic partial top view of a pressure sensing device according to one or more embodiments of the present invention, illustrating that each buffer unit of one or more embodiments comprises a plurality of buffer bumps arranged in an array at the corresponding conductive unit, and a buffer wall arranged around the corresponding conductive unit and surrounding the buffer bumps therein.

Referring to FIG. 10, the pressure sensing device 100 according to one or more embodiments of the present invention is shown. Each buffer unit 24 comprises the buffer bumps 241 and the buffer wall 242 as described above, that is, each buffer unit 24 comprises a plurality of buffer bumps 241 arranged in an array at the first electrode 211 and the second electrode 212 of the corresponding conductive unit 21 and a buffer wall 242 arranged around the corresponding conductive unit 21 and surrounding the corresponding buffer bumps 241, the first electrode 211 and the second electrode 212 therein.

Figure 11:
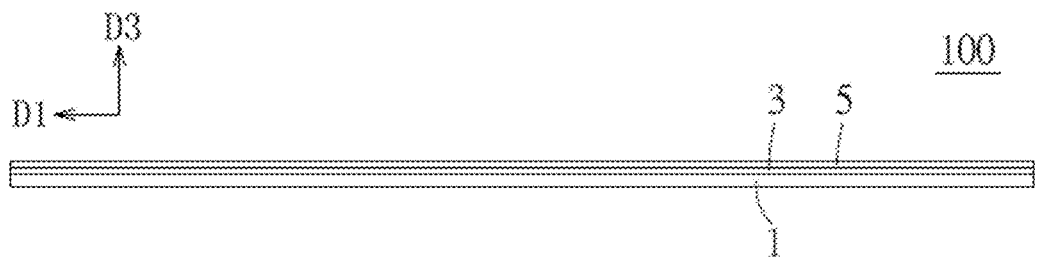
FIG. 11 is a schematic side view of a pressure sensing device according to one or more embodiments of the present invention, illustrating that a release layer of one or more embodiments is arranged on a packaging layer, and the hardness of the release layer is greater than that of the packaging layer.

Referring to FIG. 11, the pressure sensing device 100 according to one or more embodiments of the present invention is shown. The pressure sensing device 100 further comprises a release layer 5 arranged at the packaging layer 3 and having a hardness greater than that of the packaging layer 3. The release layer 5 plays a role equivalent to the buffer unit 24 (see FIG. 6). That is to say, by pre-bonding the release layer 5 on the packaging layer 3, the release layer 5 can assist in absorbing the pressure generated by the roller hot-pressing on the pressure sensing blocks 23 during the process of hot-pressing and packaging of the pressure sensing device 100, to avoid inaccurate pressure sensing sensitivity caused by excessively tight connection of the pressure sensing blocks 23 to the first electrode 211 and the second electrode 212 after the rolling of the roller, thereby ensuring that each pressure sensing block 23 in the packaged pressure sensing device 100 can be maintained in a preset uncompressed state, and the release layer 5 is peeled off after the hot-pressing, to complete the pressure sensing device 100.

Figure 12:
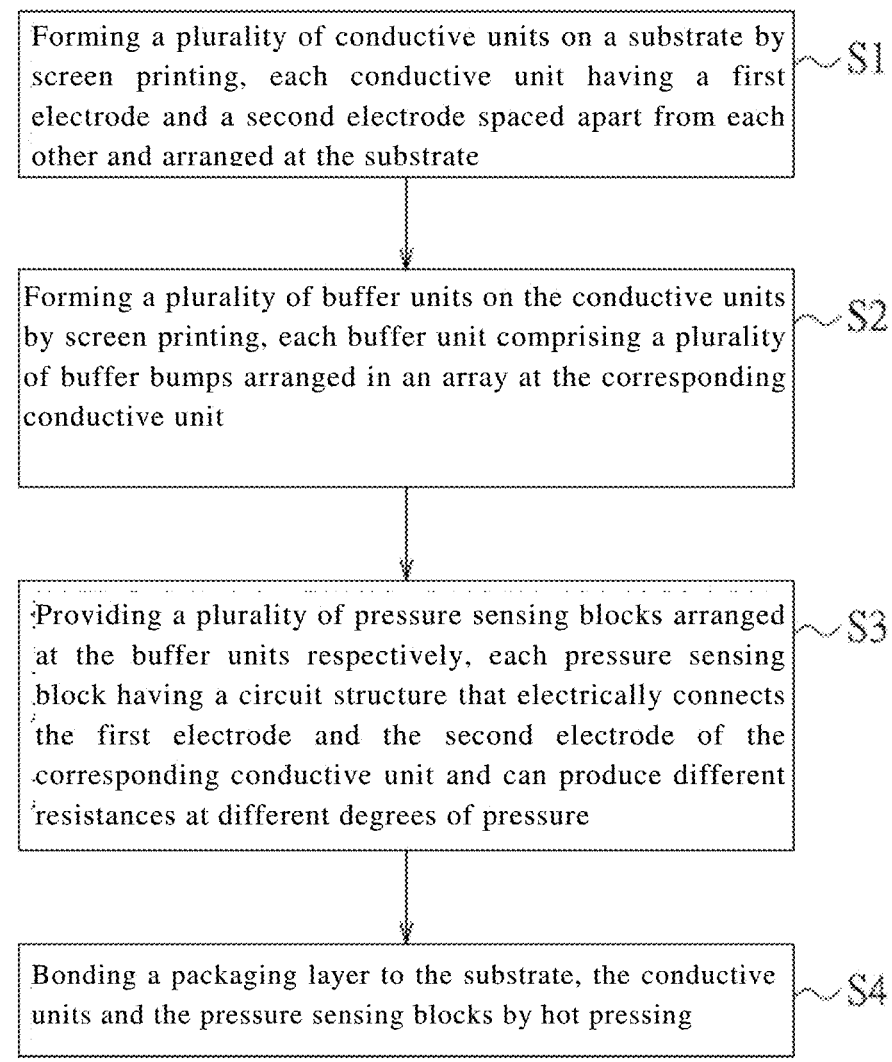
FIG. 12 is a flowchart of a manufacturing method of a pressure sensing device according to one or more embodiments of the present invention.

Referring to FIG. 12, a manufacturing method of the pressure sensing device 100 according to one or more embodiments comprises steps S1 to S4, which are described as follows:

Step S1, a plurality of conductive units 21 are formed on a substrate 1 by screen printing. The material of each conductive unit 21 is conductive silver paste, and each conductive unit 21 has a first electrode 211 and a second electrode 212 spaced apart from each other at the substrate 1, a first wire 213 connected to the first electrode 211, and a second wire 214 connected to the second electrode 212.

Step S2, a plurality of buffer units 24 are formed on the conductive units 21 by screen printing. Each buffer unit 24 comprises a plurality of buffer bumps 241 arranged in an array at the first electrode 211 and the second electrode 212 of the corresponding conductive unit 21.

Step S3, a plurality of pressure sensing blocks 23 are provided on the conductive units 21 respectively. Each pressure sensing block 23 has a circuit structure 243 that electrically connects the first electrode 211 and the second electrode 212 of the corresponding conductive unit 21 and can produce different resistances at different degrees of pressure. In this step, adhesive bodies 221 are arranged at peripheral sides of the first electrode 211 and the second electrode 212 to adhere the pressure sensing block 23 with the substrate 1, such that the pressure sensing block 23 is mechanically and electrically connected to the first electrode 211 and the second electrode 212.

Step S4, a packaging layer 3 is bonded to the substrate 1, the conductive units 21 and the buffer units 24 by hot pressing, to complete the pressure sensing device 100.

The manufacturing methods of the following embodiments are described only for differences from one or more embodiments described above.

Figure 13:
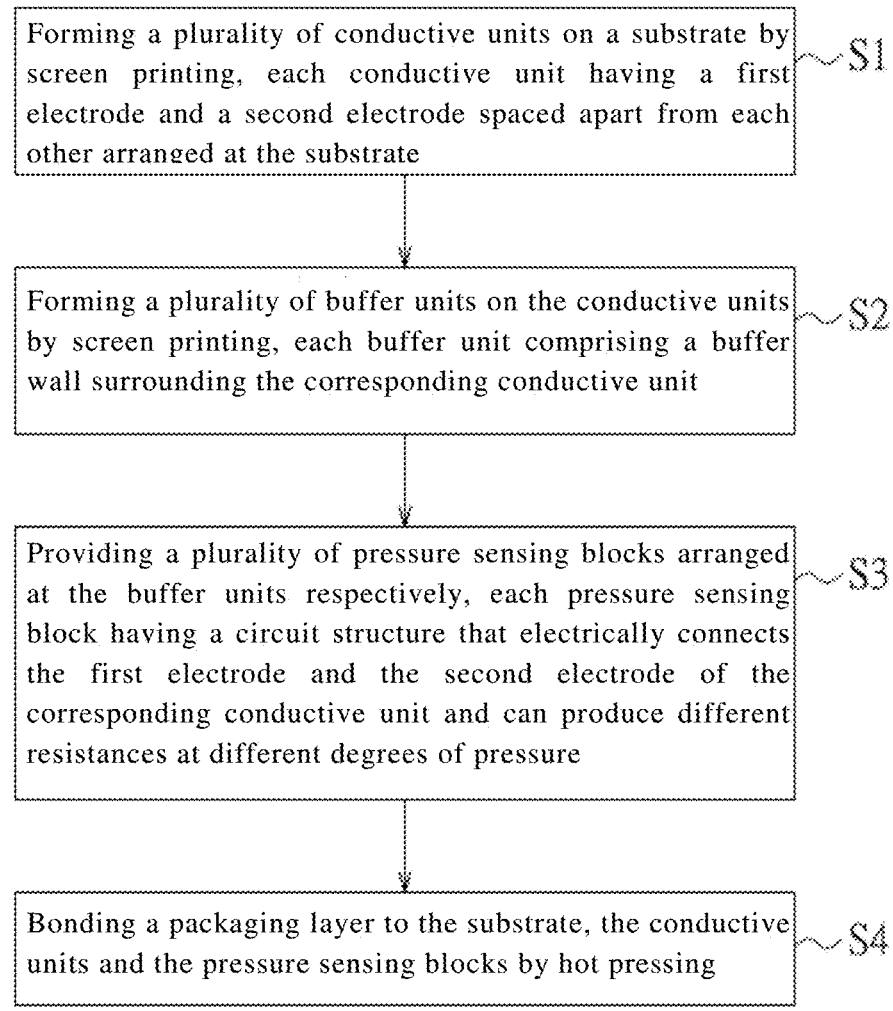
FIG. 13 is a flowchart of a manufacturing method of a pressure sensing device according to one or more embodiments of the present invention.

Referring to FIG. 13, the manufacturing method of the pressure sensing device 100 according one or more embodiments differs from the manufacturing method of the pressure sensing device 100 of the embodiment described above in that, in step S2 of one or more embodiments, a plurality of buffer units 24 are formed on the conductive units 21 by screen printing, each buffer unit 24 comprising a buffer wall 242 arranged around the corresponding conductive unit 21 and surrounding the first electrode 211 and the second electrode 212 in a hollow and square shape.

Figure 14:
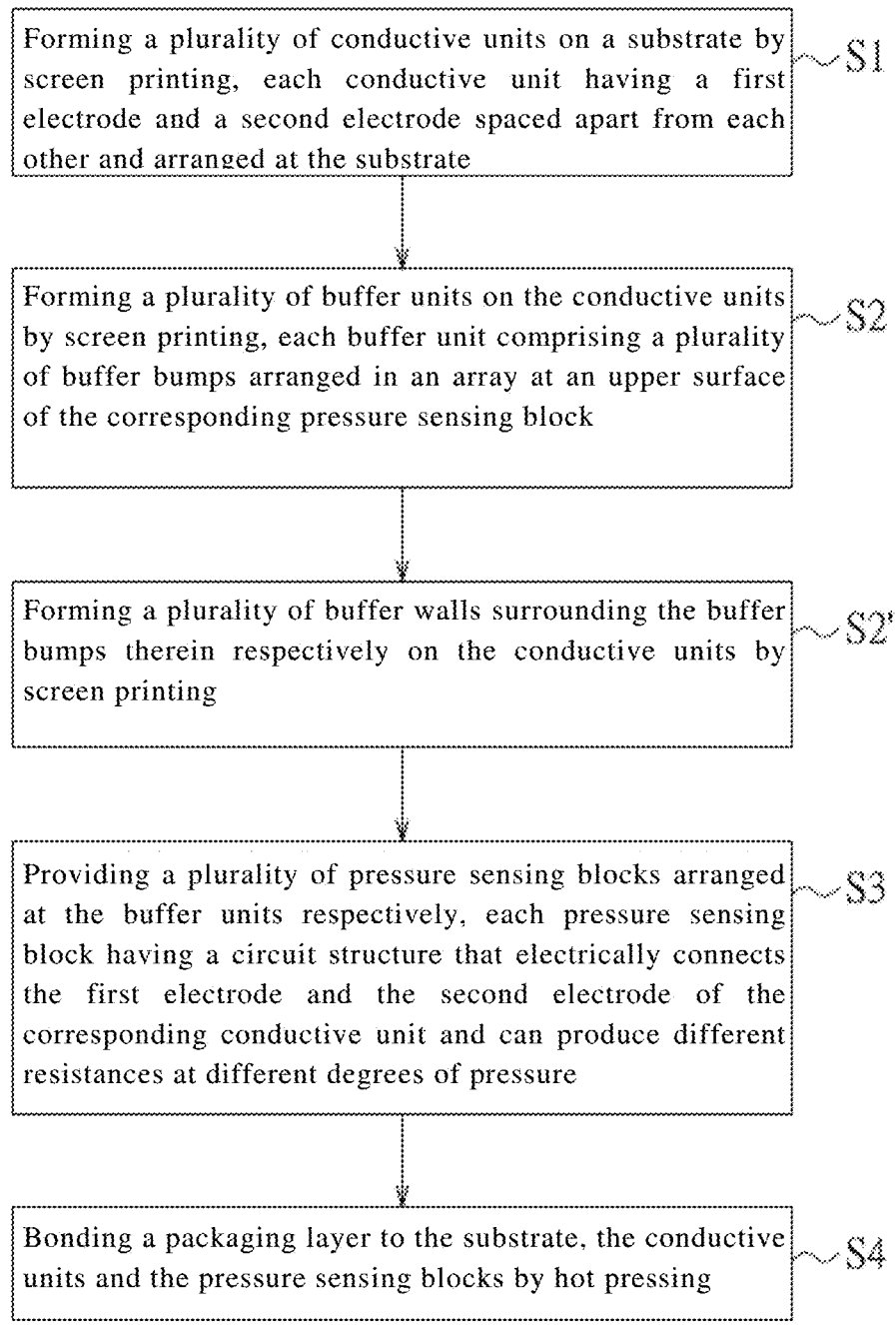
FIG. 14 is a flowchart of a manufacturing method of a pressure sensing device according to one or more embodiments of the present invention.

Referring to FIG. 14, the manufacturing method of the pressure sensing device 100 according to one or more embodiments differs from the manufacturing method of the pressure sensing device 100 of the embodiments described above in that, after step S2 of screen-printing the buffer bumps, another embodiment further comprises a step S2' of forming a plurality of buffer walls 242 on the pressure sensing blocks 23 by screen printing the buffer walls 242 surrounding the buffer bumps 241, the first electrodes 211 and the second electrodes 212 therein respectively.

Figure 15:
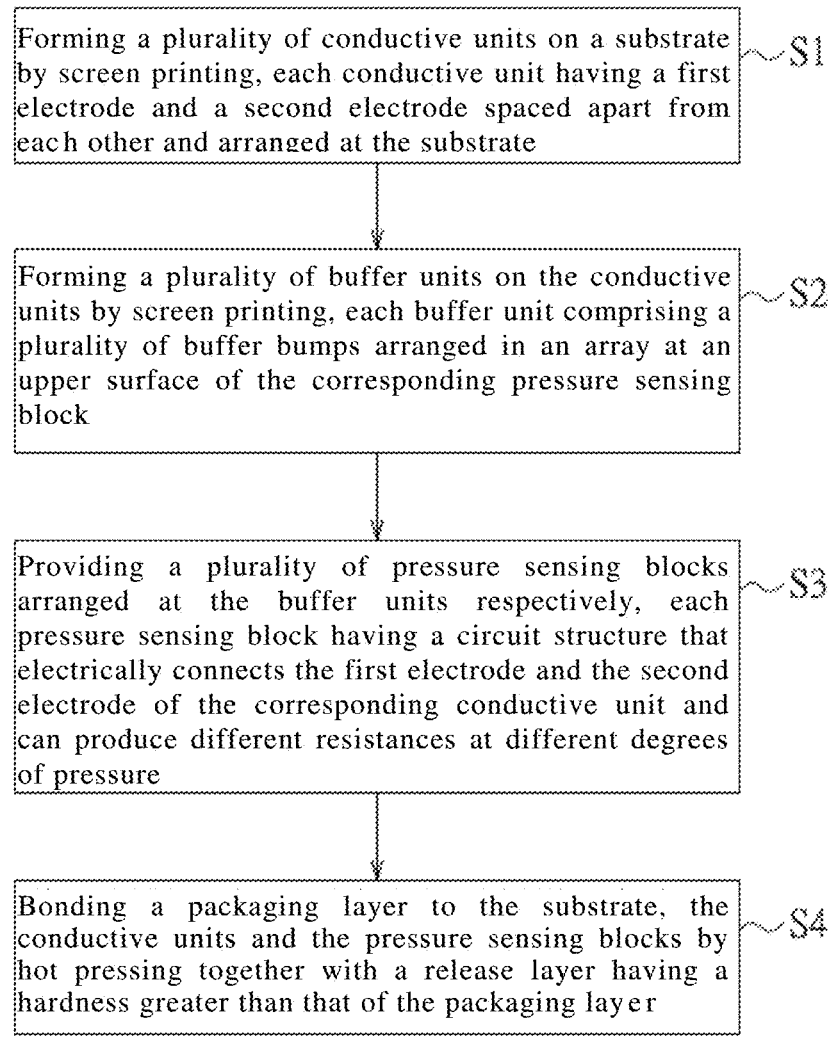
FIG. 15 is a flowchart of a manufacturing method of a pressure sensing device according to one or more embodiments of the present invention.

Referring to FIG. 15, the manufacturing method of the pressure sensing device 100 according to one or more embodiments differs from the manufacturing method of the pressure sensing device 100 of the embodiments described above in that, in step S4 of one or more embodiments, a packaging layer 3 is bonded to the substrate 1, the conductive units 21 and the pressure sensing blocks 23 by hot pressing together with a release layer 5 having a hardness greater than that of the packaging layer 3. In yet one or more embodiments, step S4 in the manufacturing method described in FIGS. 13 and 14 may also be changed to step S4 as described in FIG. 15 and is not limited to the embodiments described therein.

Based on the above, the pressure sensing device 100 according to one or more embodiments of the present invention is provided with the plurality of pressure sensing blocks 23 that are respectively and electrically connected to the first electrodes 211 and the second electrodes 212 of the plurality of conductive units 21, and when the pressure sensing module 2 of the pressure sensing device 100 is pressed, the resistances of the circuit structures 232 of the pressure sensing blocks 23 change, such that the current of different magnitudes flows through the first electrodes 211 and the second electrodes 212, and the processing unit 4 can then determine the magnitude of the pressure for the operator to observe. In addition, by arranging the buffer units 24 at the conductive units 21, no matter whether the buffer units 24 are a plurality of buffer bumps 241 arranged in an array at the first electrodes 211 and the second electrodes 212, or are buffer walls 242 surrounding the first electrodes 211 and the second electrodes 212, the pressure sensing blocks 23 can be prevented from being excessively tightly connected to the first electrodes 211 and the second electrodes 212 of the conductive units 21 due to packaging of the packaging layer 3, thereby ensuring that each pressure sensing block 23 in the packaged pressure sensing device can be maintained in a preset uncompressed state to achieve accurate pressure sensing sensitivity.

Described above are merely the embodiments of the present invention, and the scope of the present invention is not limited thereto. Any simple equivalent variations and modifications made according to the claims and description of the present invention shall fall into the scope of the present invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims

What is claimed is:

1. A pressure sensing device adapted to sense pressure and be electrically connected to a processing unit, the pressure sensing device comprising:
   a substrate;
   at least one pressure sensing module arranged at the substrate, the pressure sensing module comprising:
      a plurality of conductive units, each of the conductive units having a first electrode and a second electrode spaced apart from each other and arranged at the substrate, a first wire connected to the first electrode for grounding, and a second wire connected to the second electrode and adapted to be electrically connected to the processing unit;
      a plurality of pressure sensing blocks arranged at the conductive units respectively, each of the pressure sensing blocks having a circuit structure that electrically connects the first electrode and the second electrode of the corresponding each of the conductive units and can produce different resistances at different degrees of pressure; and
      a plurality of buffer units, each of the buffer units being arranged between the corresponding each of the conductive units and the corresponding each of the pressure sensing blocks, and each of the buffer units comprising a plurality of buffer bumps arranged in an array at the first electrode and the second electrode of the corresponding each of the conductive units; and
   a packaging layer bonded to the substrate and the conductive units and the pressure sensing blocks of the pressure sensing module.

2. The pressure sensing device according to claim 1, wherein a material of each of the buffer bumps is insulating ink.

3. The pressure sensing device according to claim 1, wherein each of the buffer units further comprises a buffer wall covering the corresponding each of the conductive unit and surrounding the buffer bumps, the first electrode and the second electrode therein.

4. The pressure sensing device according to claim 3, wherein the buffer wall is hollow and square.

5. The pressure sensing device according to claim 3, wherein a material of each of the buffer walls is insulating ink.

6. The pressure sensing device according to claim 1, further comprising a release layer arranged at the packaging layer and having a hardness greater than that of the packaging layer.

7. The pressure sensing device according to claim 1, wherein the pressure sensing module further comprises a plurality of adhesive units arranged at the substrate and respectively corresponding to the conductive units, each adhesive unit having a plurality of adhesive bodies around the first electrode and the second electrode to adhere a lower surface of the pressure sensing blocks.

8. The pressure sensing device according to claim 1, wherein each of the pressure sensing blocks further comprises an insulating layer, and the circuit structure is a plurality of conductive particles dispersed at the insulating layer.

9. The pressure sensing device according to claim 1, wherein the conductive units of each of the at least one pressure sensing module are arranged apart in a left-right direction, the first electrode and the second electrode of each of the conductive units are spaced apart in a front-back direction, and the pressure sensing device comprises a plurality of pressure sensing modules.

10. A pressure sensing device adapted to sense pressure and be electrically connected to a processing unit, the pressure sensing device comprising:
   a substrate;
   at least one pressure sensing module arranged at the substrate, the pressure sensing module comprising:
      a plurality of conductive units, each of the conductive units having a first electrode and a second electrode spaced apart from each other and arranged at the substrate, a first wire connected to the first electrode for grounding, and a second wire connected to the second electrode and electrically connected to the processing unit,
      a plurality of pressure sensing blocks arranged at the conductive units respectively, each of the pressure sensing blocks having a circuit structure that electrically connects the first electrode and the second electrode of the corresponding each of the conductive units and can produce different resistances at different degrees of pressure, and
      a plurality of buffer units, each of the buffer units being arranged between each the corresponding each of the conductive units and each of the pressure sensing blocks, and each of the buffer units comprising a buffer wall surrounding the corresponding each of the conductive units; and
   a packaging layer bonded to the substrate and the conductive units and pressure sensing blocks of the pressure sensing module.

11. The pressure sensing device according to claim 10, wherein the buffer wall is hollow and square.

12. The pressure sensing device according to claim 10, further comprising a release layer arranged at the packaging layer and having a hardness greater than that of the packaging layer.

13. The pressure sensing device according to claim 10, wherein the pressure sensing module further comprises a plurality of adhesive units arranged at the substrate and respectively corresponding to the conductive units, each of the adhesive units has a plurality of adhesive bodies around the first electrode and the second electrode to adhere a lower surface of the pressure sensing blocks.

14. The pressure sensing device according to claim 10, wherein each of the pressure sensing blocks further comprises an insulating layer, and the circuit structure is a plurality of conductive particles dispersed at the insulating layer.

15. The pressure sensing device according to claim 10, wherein the conductive units of each of the at least one pressure sensing module are arranged apart in a left-right direction, the first electrode and the second electrode of each of the conductive units are spaced apart in a front-back direction, and the pressure sensing device comprises a plurality of pressure sensing modules.

16. A manufacturing method of a pressure sensing device, comprising:
   forming, by screen printing, a plurality of conductive units on a substrate, each of the conductive units having a first electrode and a second electrode spaced apart from each other and arranged at the substrate;
   forming, by screen printing, a plurality of buffer units on the conductive units, each of the buffer units comprising a plurality of buffer bumps arranged in an array at the first electrode and the second electrode of the corresponding each of the conductive units;
   providing a plurality of pressure sensing blocks arranged at the buffer units respectively, each of the pressure sensing blocks having a circuit structure that electrically connects the first electrode and the second electrode of the corresponding each of the conductive units and can produce different resistances at different degrees of pressure; and
   bonding, by hot pressing, a packaging layer to the substrate, the conductive units and the pressure sensing blocks.

17. The manufacturing method according to claim 16, wherein after screen printing the buffer bumps, the manufacturing method further comprises forming a plurality of buffer walls on the conductive units by screen printing, the plurality of buffer walls surrounding the buffer bumps, the first electrode and the second electrode therein.

18. The manufacturing method according to claim 16, wherein the packaging layer is bonded to the substrate, the conductive units and the pressure sensing blocks by hot pressing together with a release layer having a hardness greater than that of the packaging layer.

19. A manufacturing method of a pressure sensing device, comprising:
   forming, by screen printing, a plurality of conductive units on a substrate, each of the conductive units having a first electrode and a second electrode spaced apart from each other and arranged at the substrate;
   forming, by screen printing, a plurality of buffer units on the conductive units, each of the buffer units comprises a buffer wall surrounding the corresponding each of the conductive units;
   providing a plurality of pressure sensing blocks arranged at the buffer units respectively, each of the pressure sensing blocks having a circuit structure that electrically connects the first electrode and the second electrode of the corresponding each of the conductive units and can produce different resistances at different degrees of pressure; and
   bonding a packaging layer to the substrate, the conductive units and the pressure sensing blocks by hot pressing.

20. The manufacturing method according to claim 19, wherein the packaging layer is bonded to the substrate, the conductive units and the pressure sensing blocks by hot pressing together with a release layer having a hardness greater than that of the packaging layer.

* * * * *